United States Patent [19]

Marolewski et al.

[11] Patent Number: 5,274,102

[45] Date of Patent: Dec. 28, 1993

[54] EPOXY FUNCTIONAL COPOLYMER OF HIGHER α-OLEFIN AND UNSATURATED DICARBOXYLIC ACID ESTER AND DERIVATIVES THEREOF

[75] Inventors: Theodore A. Marolewski, New City; Eric W. Burkhardt, Brewster, both of N.Y.; Uwe H. Wallfahrer, Kreuzau, Fed. Rep. of Germany

[73] Assignee: Akzo nv, Arnhem, Netherlands

[21] Appl. No.: 19,498

[22] Filed: Feb. 19, 1993

[51] Int. Cl.⁵ ............... C07D 285/125; C08F 210/00
[52] U.S. Cl. .................................. 548/142; 548/144; 558/180; 526/257; 526/259; 526/277; 525/327.3; 252/47; 252/48.4; 252/49.8; 252/50
[58] Field of Search ............ 525/327.3; 526/277, 526/257, 259; 548/142, 144; 558/180

[56] References Cited

U.S. PATENT DOCUMENTS

| | | | |
|---|---|---|---|
| 2,543,964 | 3/1951 | Giammaria | 252/56 |
| 2,615,845 | 10/1952 | Lippincott et al. | 252/56 |
| 3,304,261 | 2/1967 | Ilnyckyj et al. | 252/56 |
| 3,314,908 | 4/1967 | Kagan et al. | 260/29.6 |
| 4,732,942 | 3/1988 | Liu et al. | 525/301 |
| 4,790,948 | 12/1988 | Liu et al. | 252/47.5 |
| 4,812,261 | 3/1989 | Liu et al. | 252/51.5 A |
| 4,826,613 | 5/1989 | Hart et al. | 252/52 R |
| 4,842,756 | 6/1989 | Liu et al. | 252/48.2 |
| 4,904,403 | 2/1990 | Karol | 252/47.5 |
| 4,931,197 | 6/1990 | Beck et al. | 252/56 R |
| 5,110,491 | 5/1992 | Derosa et al. | 252/47.5 |
| 5,176,841 | 1/1993 | Wallfahrer et al. | 252/56 D |

FOREIGN PATENT DOCUMENTS 1238448  6/1988  Canada .................... C08F/218/14

OTHER PUBLICATIONS

Chemical Abstracts vol. 94, 106225h (abstracting JP No. 80, 157,687).
Derwent Patent Abstract 84-071698 (abstracting JP No. 59 25,888).

Primary Examiner—Joseph L. Schofer
Assistant Examiner—Mark Nagumo
Attorney, Agent, or Firm—Richard P. Fennelly; Louis A. Morris

[57] ABSTRACT

Epoxy functional copolymers of a higher α-olefin, and an unsaturated dicarboxylic acid ester formed by copolymerization of olefin, acid ester and ethylenically unsaturated glycidyl compound can be used to form nitrogen, oxygen, phosphorus and/or sulfur-containing lubricant additives by reaction of the epoxy functionality in such a copolymer with glycidyl-reactive compounds containing nitrogen, oxygen, phosphorus and/or sulfur atoms. Alternatively, the copolymerization reaction can utilize the olefin, unsaturated acid ester, and an ethylenically unsaturated compound containing the nitrogen, phosphorus and/or sulfur atom, which compound is formed by reaction of ethylenically unsaturated glycidyl compound and an epoxy-reactive nitrogen, phosphorus, and/or sulfur-containing compound.

10 Claims, No Drawings

EPOXY FUNCTIONAL COPOLYMER OF HIGHER α-OLEFIN AND UNSATURATED DICARBOXYLIC ACID ESTER AND DERIVATIVES THEREOF

BACKGROUND OF THE INVENTION

Copolymers of α,β-unsaturated dicarboxylic acid esters and α-olefins are useful as lubricant compositions or additives. Some recent examples of disclosures include U.S. Pat. No. 4,931,197 to H. Beck et al. and Canadian Patent No. 1,238,448 to Akzo N.V. Copolymers of this type which are butanol esters of α-olefin-dicarboxylic acid copolymers (average molecular weight of 1200-2500) are, moreover, commercially available under the trademark KETJENLUBE from Akzo Chemicals Inc. and Akzo Chemicals b.v.

DESCRIPTION OF THE INVENTION

The present invention relates to epoxy functional copolymers of the previously described type as well as derivatives thereof which can contain such elements as nitrogen, oxygen, phosphorus and/or sulfur which would be useful in lubricant compositions, for example, as anti-wear additives.

The novel epoxy functionalized copolymers, which constitute one embodiment of the present invention, are formed by the copolymerization of a suitable α-olefin, an unsaturated dicarboxylic acid ester, and an ethylenically unsaturated glycidyl compound. The epoxy-functionalized copolymer which results is then reacted with an epoxy-reactive compound containing the desired elements of the foregoing type (e.g., nitrogen, oxygen, phosphorus and/or sulfur) to form the final desired product.

An alternative approach is to form the ultimately desired derivative containing the nitrogen, oxygen, phosphorus and/or sulfur elements directly by copolymerizing the α-olefin and unsaturated dicarboxylic ester with an ethylenically unsaturated compound which already contains the desired elements identified above. This third comonomer, containing those elements, can be formed by reaction of an ethylenically unsaturated glycidyl compound, using the glycidyl functionality as the reaction site, with a compound containing a glycidyl reactive group and the desired element(s) as will be shown in greater detail below.

The types of α-olefin monomers which can be used to form the instant copolymers can be selected from those previously used in synthesizing the known, non-functionalized α,β-unsaturated dicarboxylic acid ester/α-olefin copolymers having lubricant utility. Preferred for use herein are higher α-olefins having from about ten to about twenty carbon atoms, particularly those of from twelve to about eighteen carbon atoms.

The α,β-unsaturated dicarboxylic acid esters which can be used to synthesize the present copolymers also can be selected from those previously used in synthesizing the known copolymers previously described. The esters of maleic, fumaric, citraconic, mesaconic, or itaconic can be chosen, with the first two being preferred. For example, esters having a straight-chain and/or branched chain monoalcohol component of from three to ten carbon atoms can be used.

In order to achieve either epoxy-functional copolymers which can be further derivatized or the final, derivatized species, an additional ethylenically unsaturated monomer is copolymerized with the foregoing comonomers. This additional monomer is either: (a) an ethylenically unsaturated glycidyl compound, in those instances where an epoxy-functional copolymer is desired; or (b) an ethylenically unsaturated compound containing at least one of the previously enumerated elements (nitrogen, oxygen, phosphorus and/or sulfur) where the final derivative is desired, and it is intended that a one step copolymerization process by used to effectuate its formation.

If third monomer (a) is chosen for use it will contain ethylenic unsaturation and a glycidyl group. This type of compound can be envisioned as having the structure

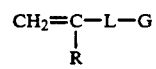

where G is a glycidyl group, R is hydrogen or methyl, and L is an organo group linking the ethylenic unsaturation and glycidyl group, such as —C(O))—. Representative compounds which can be employed include the glycidyl acrylates and methacrylates. The glycidyl group is available for reaction with the glycidyl-reactive compounds to be described below.

If the third monomer (b) is chosen, this can be a reaction product of monomer (a) with a glycidyl reactive compound which also contains the desired elements in the ultimate final product. The glycidyl-reactive compounds enumerated hereinbelow should be understood as being useful. For example, a dialkyl dithioacid phosphate of the formula

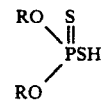

where R is alkyl, such as $C_1$-$C_{10}$ alkyl, can be a source of both phosphorus and sulfur with the group —SH providing for reaction with the glycidyl moiety.

If phosphorus and oxygen atoms are desired in the ultimate final product, a glycidyl-reactive dialkyl acid phosphate compound of the following formula can be chosen for reaction with the glycidyl moiety, under conditions as previously described:

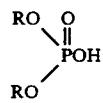

where R is alkyl, such as $C_1$-$C_{10}$ alkyl, or aryl.

Sulfur and nitrogen atoms can be analogously provided by use of a glycidyl-reactive dimercapto thiadiazole, such as 2,5-dimercapto-1,3,4-thiadiazole compound which is described in U.S. Pat. No. 5,110,491:

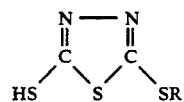

where R is hydrogen or alkyl, such as $C_1$-$C_{10}$.

Nitrogen atoms can be provided by use of the amino carbazole compounds, for example, illustrated in European Patent Publication No. 414,343.

The present invention is further illustrated by the Examples which follow.

EXAMPLE 1

This Example illustrates the incorporation of epoxide side chains into an α-olefin dibutylmaleate copolymer.

Dibutylmaleate (1 mole) and a $C_{14}/C_{16}$ α-olefin mixture (0.9 mole) were heated to 160° C. and, at this temperature, glycidyl methacrylate (0.1 mole) and di-tert-butylperoxide (8 g) were added continuously to that reaction mixture within three hours. After a further twenty minutes at this temperature, the volatiles were distilled off in vacuo. The resulting polymer was a colorless viscous liquid which contained 3% epoxy side chains and had an average molecular weight of 2400.

EXAMPLE 2

This Example illustrates the incorporation of sulfur and phosphorus functionality into the epoxy functionalized copolymer of Example 1.

Seventy grams of the copolymer from Example 1 and a stoichiometric amount (3.7 g) of dibutyldithiophosphate was heated to 80° C. until the content of free epoxy groups decreased below 0.1% (about two hours). The reaction product was a yellowish, bad smelling viscous oil. This oil, when present as a 10% solution in 150N mineral oil, gave an abrasion of 2.3 mm$^2$ in a REICHERT wear tester. For comparison, a copolymer of dibutylmaleate and $C_{14}$-$C_{16}$ α-olefin of similar viscosity without the sulfur and phosphorus functionality yielded a worse abrasion value of 9 mm$^2$.

EXAMPLE 3

This Example illustrates preparation of a sulfur and phosphorus-containing monomer for reaction with an epoxy functionalized-α-olefin-dibutylmaleate copolymer.

Glycidyl methacrylate was dosed continuously to one mole of dibutyldithiophosphate at 80° C. within one hour. The reaction mixture was stirred at this temperature until the concentration of free dibutyldithiophosphate had diminished below 2%. The reaction product was a faint yellow, non-smelling liquid.

EXAMPLE 4

This Example illustrates the incorporation of the sulfur and phosphorus monomer of Example 3 into an α-olefindibutylmaleate copolymer.

Two moles of $C_{14}/C_{16}$ α-olefin mixture and two moles of dibutylmaleate were heated to 160° C. At this temperature, 0.2 mole of the monomer from Example 3 and 16 g of di-tert-butylperoxide were added within three hours. After a further hour of stirring at this temperature, the volatiles were removed in vacuo. The reaction product showed similar analytical and wear properties to the product of Example 2.

The foregoing Examples are presented for illustrative purposes only and should therefore not be construed in a limiting sense. The scope of protection sought is set forth in the claims which follow.

We claim:

1. A copolymer formed by reaction of an epoxy functional copolymer of (1) a higher α-olefin; (2) an unsaturated dicarboxylic acid ester; and (3) an ethylenically unsaturated glycidyl compound; with an epoxy reactive compound containing at least one element selected from the group consisting of nitrogen, phosphorus, and sulfur.

2. A copolymer as claimed in claim 1 wherein the epoxy reactive compound is a dithiophosphate.

3. A copolymer of: (1) a higher α-olefin; (2) an unsaturated dicarboxylic acid ester; and (3) an ethylenically unsaturated compound containing at least one element selected from the group consisting of nitrogen, phosphorus and sulfur.

4. A copolymer as claimed in claim 3 wherein compound (3) comprises a moiety derived from a dithiophosphate.

5. A copolymer as claimed in claim 3 wherein the α-olefin contains from about ten to about twenty carbon atoms, the acid ester contains from about three to about ten carbon atoms, and the ethylenically unsaturated compound (3) is formed by reaction of a glycidyl compound of the formula

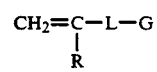

where G is a glycidyl group, R is hydrogen or methyl, and L is an organo group linking the ethylenic unsaturation and glycidyl group with a glycidyl reactive compound containing at least one element selected from the group consisting of nitrogen, oxygen, phosphorus, and sulfur.

6. A copolymer as claimed in claim 5 wherein the glycidyl reactive compound is a dialkyl dithioacid phosphate.

7. A copolymer as claimed in claim 5 wherein the glycidyl reactive compound is a dialkyl acid phosphate.

8. A copolymer as claimed in claim 5 wherein the glycidyl reactive compound is a dimercapto thiadiazole.

9. A copolymer as claimed in claim 5 wherein the glycidyl reactive compound is an amino carbazole compound.

10. A copolymer as claimed in claim 5 wherein the glycidyl compound is selected from the group consisting of the glycidyl acrylates and glycidyl methacrylates and the glycidyl reactive compound is selected from the group consisting of a dialkyl dithioacid phosphate, a dialkyl acid phosphate, a dimercapto thiadiazole and an amino carbazole.

* * * * *